(12) United States Patent
Weber

(10) Patent No.: US 11,759,737 B2
(45) Date of Patent: Sep. 19, 2023

(54) MODULAR FILTER SYSTEM

(71) Applicant: Detlef Weber, Essen (DE)

(72) Inventor: Detlef Weber, Essen (DE)

( * ) Notice: Subject to any disclaimer, the term of this patent is extended or adjusted under 35 U.S.C. 154(b) by 603 days.

(21) Appl. No.: 16/960,548

(22) PCT Filed: Dec. 19, 2018

(86) PCT No.: PCT/EP2018/085766
§ 371 (c)(1),
(2) Date: Jul. 8, 2020

(87) PCT Pub. No.: WO2019/141476
PCT Pub. Date: Jul. 25, 2019

(65) Prior Publication Data
US 2021/0060468 A1 Mar. 4, 2021

(30) Foreign Application Priority Data
Jan. 16, 2018 (DE) .................... 20 2018 100 226.0

(51) Int. Cl.
*B01D 46/00* (2022.01)
*B01D 46/62* (2022.01)
*B01D 45/06* (2006.01)

(52) U.S. Cl.
CPC ....... *B01D 46/0005* (2013.01); *B01D 46/003* (2013.01); *B01D 46/62* (2022.01); *B01D 2265/024* (2013.01); *B01D 2279/35* (2013.01)

(58) Field of Classification Search
CPC .. B01D 46/00; B01D 46/0005; B01D 46/003; B01D 46/62; B01D 2265/024; B01D 2279/35

(Continued)

(56) References Cited

U.S. PATENT DOCUMENTS 4,913,085 A * 4/1990 Vohringer .............. B01D 46/76
55/483
5,332,409 A 7/1994 Dralle
(Continued)

FOREIGN PATENT DOCUMENTS

DE   10 2010 047 877 A1   4/2012
DE   10 2014 101 184 A1   11/2014
EP   1 939 456 B1   3/2014

OTHER PUBLICATIONS

Munters Euroform GMBH: "DFM 2100 Modular-Tropfenabschneider", Technische Merkmale, Technical Features, English Translation, pp. 1.

(Continued)

*Primary Examiner* — Minh Chau T Pham
(74) *Attorney, Agent, or Firm* — Norman B. Thot

(57) ABSTRACT

A separator system for separating drops and solid particles from an air inlet flow. The separator system includes an air inlet channel opening and a separating body which is internally installed. The separating body is arranged downstream of the air inlet channel opening so as to completely cover the air inlet channel opening and to extend flat in a mounting plane. The separating body is provided as a modular design and includes, in the mounting plane, at least one first separating part, and at least one second separating part which is arranged to be separate from the at least one first separating part.

15 Claims, 5 Drawing Sheets

(58) Field of Classification Search
USPC .......... 55/492, 496, 497, 501, 502, DIG. 31, 55/DIG. 35
See application file for complete search history.

(56) References Cited

U.S. PATENT DOCUMENTS

| | | | | |
|---|---|---|---|---|
| 5,476,526 | A * | 12/1995 | Attermeyer | B01D 46/0002 55/496 |
| 5,843,198 | A * | 12/1998 | Walker | B01D 46/10 55/486 |
| 5,944,860 | A * | 8/1999 | Mack | B01D 46/0005 55/497 |
| 6,699,301 | B1 * | 3/2004 | Eisenhauer | F04D 29/703 55/DIG. 35 |
| 6,916,352 | B2 * | 7/2005 | Sutton | B01D 46/12 55/483 |
| 7,261,757 | B2 * | 8/2007 | Duffy | B01D 46/521 55/497 |
| 8,597,392 | B2 * | 12/2013 | Stahl | F02M 35/024 55/497 |
| 8,795,404 | B2 * | 8/2014 | Lange | B01D 46/0005 55/497 |
| 8,951,322 | B2 * | 2/2015 | Pfannenberg | B01D 45/08 55/467 |
| 9,039,801 | B2 * | 5/2015 | Gorman | B01D 46/10 55/495 |
| 9,610,528 | B2 * | 4/2017 | Porbeni | B01D 46/10 |
| 9,776,119 | B2 * | 10/2017 | Choy | B01D 46/10 |
| 10,603,616 | B1 * | 3/2020 | Nance | B01D 46/0002 |
| 10,641,520 | B2 * | 5/2020 | Conrad | F24F 7/065 |
| 10,661,211 | B2 * | 5/2020 | Graves | B01D 46/001 |
| 10,744,443 | B2 * | 8/2020 | Silvestro | B01D 46/0005 |
| 10,808,950 | B2 * | 10/2020 | Nanjappa | F24F 8/108 |
| 2007/0220851 | A1 | 9/2007 | Parker et al. | |
| 2008/0160898 | A1 | 7/2008 | Pfannenberg | |
| 2010/0192528 | A1 | 8/2010 | Mann et al. | |
| 2010/0251678 | A1 | 10/2010 | Mann et al. | |
| 2016/0105996 | A1 | 4/2016 | Schanzenbach et al. | |

OTHER PUBLICATIONS

Munters Euroform GMBH: "packet H multi part '54' DH5425", Technical Drawing No. 1-015303.00009#_54, pp. 1.

* cited by examiner

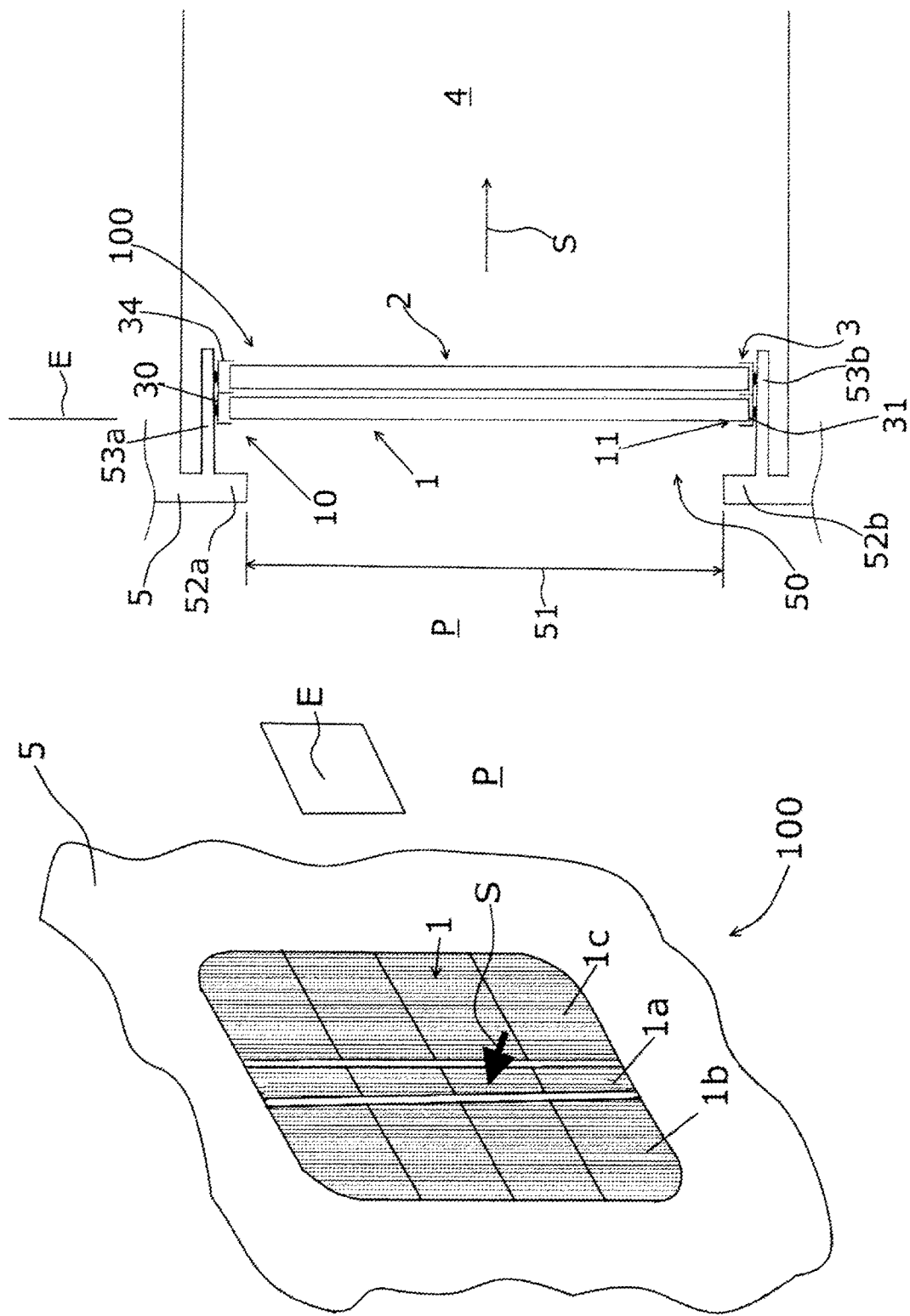

MODULAR FILTER SYSTEM

CROSS REFERENCE TO PRIOR APPLICATIONS

This application is a U.S. National Phase application under 35 U.S.C. § 371 of International Application No. PCT/EP2018/085766, filed on Dec. 19, 2018 and which claims benefit to German Patent Application No. 20 2018 100 226.0, filed on Jan. 16, 2018. The International Application was published in German on Jul. 25, 2019 as WO 2019/141476 A1 under PCT Article 21(2).

FIELD

The present invention relates to a separator system for separating drops and solid particles from an air inlet flow, comprising an internally mounted separating body, which is arranged downstream of an air inlet channel opening and which completely covers the air inlet channel opening and which extends flat in a mounting plane.

BACKGROUND

Separator systems for removing drops and solid particles are known in various configurations. An arrangement of such a separator system at the inlet end, for example, on an ambient air inlet opening of a ventilation system, is frequently used, for example, on ships. In this case, ventilation systems are used which have air inlets which usually form the intake duct of a compressor, for example, for supplying combustion air to the main engine, for ventilating the engine rooms, for fresh air supply, and to provide air conditioning of passenger cabins, crew cabins, as well as of some special cargo compartments. Such separator systems are also increasingly used for ventilation and air conditioning systems of buildings which are located in urban areas, near a desert, or near the sea. In the aforementioned examples, the removal of water, dust, sea salt, or desert sand is in particular required in order to avoid, for example, corrosion, abrasion, air pollution, odors, or other undesirable effects such as, for example, an impairment of electrical or electronic components. In this case, the separating body is generally designed as a single-stage or multi-stage lamellar separator, for example, as a lamellar baffle. So-called coalescers, agglomerators, and residual drop collectors or also filters are additionally used as supplementary components. Such separating bodies must be regularly cleaned and maintained in order to deal with the increasing general air pollution as well as the continuously rising demands concerning air quality, such as, for example, in the case of an airport located at sea. This maintenance is regularly necessary, in particular when coalescers and filters are used.

In an arrangement on an air inlet opening of an air inlet channel, the separating body is generally superimposed or inserted from the outside directly onto or into the wall region surrounding the air inlet opening, and is fastened thereto from the outside, for example, with screws. Separating bodies which are superimposed can in this case have a relatively large effective surface area, wherein the effective surface area should be understood to in particular be the surface area of the separating body through which air can flow. Internal installations are also known, i.e., mounting on a side of the air inlet channel opening facing downstream, for example, in a wall region arranged there, such as on an inner wall of the air inlet channel. For mounting, cleaning and maintenance of the separating body, it is necessary in the last mentioned configuration for the separating body to be accessible from a position, i.e., the mounting position, which downstream of the air inlet opening, in particular downstream of the installation location of the separating body. This is generally made possible by a manhole or a service hatch arranged on the air inlet channel. Without this access, an internal installation access, and therefore maintenance, would no longer be possible.

Such accessibility is, however, relatively awkward and is not always technically feasible, for example, because of the size or arrangement of the air inlet channel and, when used on ships, because of compact construction. A superimposed or inserted installation is imperative in such cases. Because of the additional space required, the comparatively smaller passage surface, in particular with the already minimally designed air inlet opening, such as is usually the case, for example, for preventing structural instability when the air inlet channel opening is formed in a side wall of a ship, this is frequently undesirable because of visual appearance and also because of other technical conditions such as, for example, inlet pressure fluctuations due to turbulence. The aforementioned objectives of visual appearance, reduced space requirement, and the possibility of maintenance are thus in conflict.

SUMMARY

An aspect of the present invention is to provide a separator system which remedies at least one of the above-mentioned disadvantages and in particular provides an uncomplicated, time-saving, and cost-effective mounting and maintenance as well as a relatively high degree of efficiency in terms of method and which at the same time provides an esthetically pleasing visual appearance.

In an embodiment, the present invention provides a separator system for separating drops and solid particles from an air inlet flow. The separator system includes an air inlet channel opening and a separating body which is configured to be internally installed. The separating body is arranged downstream of the air inlet channel opening so as to completely cover the air inlet channel opening and to extend flat in a mounting plane. The separating body is provided as a modular design and comprises, in the mounting plane, at least one first separating part, and at least one second separating part which is arranged to be separate from the at least one first separating part.

BRIEF DESCRIPTION OF THE DRAWINGS

The present invention is described in greater detail below on the basis of embodiments and of the drawings in which:

FIG. 4 shows an embodiment of a separator system according to the present invention;

FIG. 5 shows an embodiment of a separator system according to the invention where the separating parts are arranged within a guide track device which is fastened to a frame wall;

DETAILED DESCRIPTION

Figure 1:
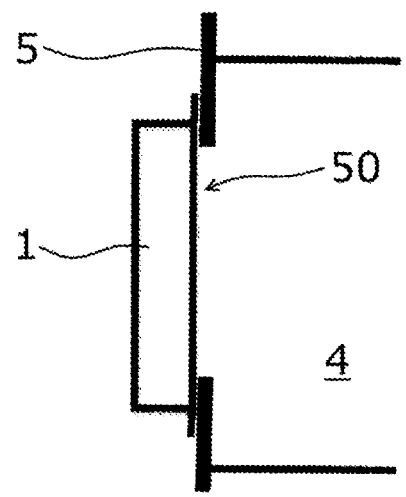
FIG. 1 shows a known type of mounting of a separator in a sectional view, and in particular a so-called superimposed installation.

The present invention provides a separating body which has a modular design and which has, in the mounting plane, at least one first separating part and one separate second separating part. The separating body, in individual and separate separating parts, can thereby be progressively mounted, maintained, and demounted in a particularly simple manner. In the case of mounting from the outside, the individual separating parts can in particular be progressively introduced into the air inlet channel through the air inlet channel opening in a particularly uncomplicated manner, and can be fastened in the provided mounting plane, in particular immediately downstream of the air inlet channel opening, and in the case of demounting, for example, for maintenance purposes, can, for example, be released and removed individually from the mounting position. Mounting of the system can, for example, begin with a separating part to be arranged laterally, wherein this separating part is guided centrally through the air inlet channel opening and then is fastened in the mounting plane, laterally offset with respect to the center of the air inlet channel opening. The mounting of the separating part or the further separating parts to be arranged laterally takes place in the same way, wherein, lastly, a separating part to be arranged centrally between the laterally arranged separating parts is inserted. The sequence is reversed when demounting. The procedure demounting begins with the centrally arranged separating part and then the laterally arranged separating parts being offset into the center of the air inlet channel and removed from the mounting plane, for example, through the air inlet channel opening. It should be clear that each separating part comprises a basic structure such as a frame which provides stability and a separating device, for example, a lamella set. The separating parts form the separating body in the mounted state. The separating parts and the separating body can, for example, be rectangular as a whole in each case.

The separating body can, for example, be mounted completely from a position located upstream of the mounting plane, in particular the mounting position. The mounting plane is in particular arranged internally, i.e., inside the ventilation duct, for example, behind a side wall of a ship. It is thereby possible to at least partially overcome the limitation of the air inlet channel opening, in particular in terms of flow technology. The air inlet channel opening is generally limited in size for structural or design reasons or other reasons relating to a ship's architecture. In the form of installation conventionally employed, a part of the open surface is usually also occupied by a frame, a cover and a trough of the separator, thereby significantly reducing the effective separator surface area. The effective separator surface area is in particular the surface through which air can flow directly and which is equipped with separator lamellas. In the case of an internal installation, the frame, the cover and the trough can be set behind the side wall and, as a result, the effective surface area in relation to the surface of the air inlet channel opening can even be increased because the frame is made even larger. Air immediately extends behind the air inlet channel opening so that the separator can be larger. The design can, for example, be such that from the mounting position which is arranged, for example, externally, i.e., in the surroundings of the air inlet channel opening, in particular without accessing or stepping on the flow channel, the separating body can be mounted, maintained and demounted in a particularly uncomplicated, fast, and cost-effective manner through the air inlet channel opening. The separating body can, for example, be designed so that the separating parts can be introduced individually through the air inlet channel opening into the air inlet channel and can be assembled there to form a separating body. An installer can in this case always remain upstream of the mounting plane or of the air inlet channel opening, i.e., in an environment that is outside of the air inlet channel. A particularly simple mounting and demounting of the separating body is thus possible.

The separating body can, for example, have an effective separator surface area which, in terms of amount, corresponds at least to the effective separator surface area of a comparable superimposed or inserted separator system. A particularly effective separation is thus also possible in the case of an internally installed separator system as a result.

In an embodiment of the present invention, the separating body can, for example, be arranged overlapping in at least one edge portion with a frame wall region surrounding the air inlet channel opening in the flow direction. The flow cross section or the passage surface of the air inlet channel opening can in this way remain unchanged by the separator system so that a volumetric flow through the air inlet channel opening remains unaffected by the arrangement of the separator system. Each separating part can, for example, be arranged to be overlapping in at least one edge portion with the frame wall region in the flow direction, for example, in each case with a portion in the end face region. Since the separating parts can, for example, project on the air inlet channel opening at the top, at the bottom and/or at the sides, the effective separation surface area can be even greater than the passage surface of the air inlet channel opening. The air advantageously spreads out immediately to the sides in this case as soon as it is drawn into the separator through the air inlet channel opening. The speed and also the pressure loss can thus be advantageously reduced.

The separating body can, for example, be arranged in a contactless manner relative to a frame wall region surrounding the air inlet channel opening, in particular in a contactless manner relative to the side of the frame wall facing in the downstream direction. Structural changes on the frame wall can in particular be avoided as a result, which is desirable in particular in shipbuilding.

The separating parts, for example, for mounting and/or maintenance purposes, can, for example, be separately inserted into or removed from the mounting plane. Individual separating parts can, for example, thereby be mounted, maintained, and demounted in a particularly uncomplicated, fast, and cost-effective manner through the air inlet channel opening. The separating body can, for example, be designed so that, in the case of mounting, the individual separating parts to be mounted can in particular be progressively introduced through the air inlet channel opening into the adjoining air inlet channel, and can be fastened in the provided mounting plane, in particular immediately downstream of the air inlet channel opening, and in the case of demounting, for example, for maintenance purposes, can for example, be released and removed individually from the mounting position. The separating parts can, for example, be additionally mounted or demounted independently of one another so that, for example, maintenance of individual separating parts can take place particularly quickly.

In an embodiment of the present invention, the separating parts in an installed state can, for example, be releasably connected to one another, for example, by a corresponding configuration of an end face wall. A particular stability of the separating body can thus be provided.

The separating parts can, for example, have, on at least two opposing end faces, at least one plug-type or latching connecting element which correspond to one another, for example, a projecting pin on an end face arranged on the left in the flow direction and a corresponding socket on an end face arranged on the right in the flow direction. The pin and the socket can be additionally designed, for example, as a latching connection. The separating parts can thus be connected to one another and fixed to one another in a particularly simple manner.

In an embodiment of the present invention, the separating body can, for example, be supported in at least one guide track or guide track device. A particularly uncomplicated mounting is thus possible. The guide track can be designed, for example, as a slot, a U profile, or a W profile, which is arranged horizontally in a frame wall region arranged below the air inlet channel opening, and into which each of the individual separating parts can be inserted from above with an edge portion in a relatively simple manner and which can, for example, be displaced laterally. In the last-mentioned example, an additional fixing can, for example, be enabled by an additional guide track which is arranged above the air inlet channel opening and in which the separating parts are supported by an opposing end edge portion. Alternatively or in addition thereto, the guide tracks can also be arranged vertically in a left and/or in a right side region of the air inlet channel opening. These guide tracks have the purpose of avoiding leakages at the sides in particular in multi-stage systems. The guide tracks overall can thus, for example, form a frame which completely surrounds the separating body and as a result can provide a particularly high stability of the separator system.

The separating body and/or the separating parts can, for example, be supported displaceably in the at least one guide track. A particularly uncomplicated mounting is thus possible. The separating parts can in particular be inserted centrally into the guide track through the air inlet channel opening in the mounting plane, and then inside the guide track, the separating parts can be displaced reliably and in a particularly simple manner toward one side into an end position, for example, in the flow direction behind the frame wall region.

The guide track can, for example, have over its longitudinal extent at least two guide track segments which are independently releasable from one another. The separating body can thereby be inserted into the guide track in a particularly quick and uncomplicated manner. A portion of the guide track, in particular a first guide track segment, can thus be released and removed so that in this region, the separating body or a separating part can be inserted and pushed, for example, laterally, into a second guide track segment which is configured as a slot or profile.

An additional separator or filter can, for example, be mounted in the guide track, in particular in an additional parallel guide track part, downstream of the separating body. A multi-stage system having one or more further separator stages and/or filter stages can thus be provided. Further guide track parts or additional guide tracks can be arranged downstream and in parallel with the mounting plane of the separating body therefor. A plurality of guide tracks arranged in parallel with one another in the flow direction can thus be provided, for example, in order to arrange further separators and/or filters downstream, such as, for example, a coalescence separator. This is in particular advantageous for use on a ship. In the case of such a multi-stage separator system, at least the rear separating body can, for example, be fixed by an inserted and firmly installed retaining member.

The air inlet channel opening can, for example, be formed on a frame wall which extends flat and which can, for example, be orthogonal to the course of an air inlet channel. The frame wall can in particular be an outer wall of a ship, in particular a side wall of a ship, or an outer wall of a building.

The mounting plane can, for example, be oriented vertically or at an angle of at least 45° relative to the horizontal. In such an embodiment, the separating body consequently extends flat vertically or at an angle of at least 45° relative to the horizontal. This is in particular advantageous in a vertically or obliquely arranged air inlet channel opening or frame wall. The frame wall can, for example, in particular be a vertically oriented outer wall of a ship, in particular a side wall of a ship, or a vertical outer wall of a building, which is adjoined by an air inlet channel oriented horizontally at least in the inlet region.

The separator system, in particular the components of the system which are not flow-related, can in principle be manufactured from aluminum or steel, in particular from stainless steel. The separator system can, for example, be produced from plastic, thus enabling a saving of weight and providing corrosion resistance.

An exemplary embodiment of the present invention is explained in detail below under reference to the drawings.

Figure 2:
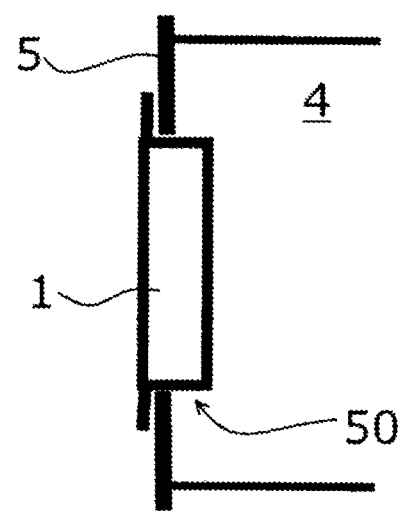
FIG. 2 shows a known type of mounting of a separator in a sectional view, and in particular a so-called inserted installation.
Figure 3:
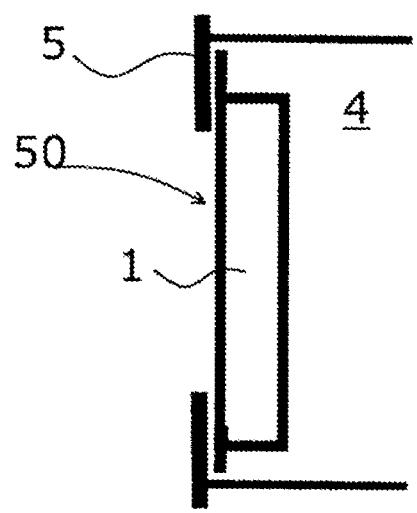
FIG. 3 shows a known type of mounting of a separator in a sectional view, and in particular a so-called internal installation.

Each of FIGS. 1-3 shows an arrangement and type of mounting of a separating body 1 in the region of an air inlet channel opening 50 on a frame wall 5 as described in the prior art. FIG. 1 in particular shows a so-called superimposed installation in which the separating body 1 is set onto the frame wall 5 from the exterior and is fastened to the frame wall 5. The separating body 1 projecting out of the frame wall 5 is in this case disadvantageous in particular with respect to a space-saving construction, as may be the case in ship superstructures. FIG. 2 shows a so-called inserted installation in which the separating body 1 is arranged in the plane of the air inlet channel opening 50 and at least in part passes through the air inlet channel opening 50. A disadvantage of this embodiment is the reduction of the flow cross section in the region of the air inlet channel opening. FIG. 3 shows a so-called internal installation of the separating body 1 on the frame wall 5 which forms a configuration which is both space-saving and also advantageous in terms of flow technology. It is, however, disadvantageous in that for installation, maintenance, and demounting, it is in this case necessary for the installation space to be accessible from a position located downstream of the air inlet channel opening, i.e., the air inlet channel 4 must be accessible. This is not, however, always technically feasible.

FIG. 4 shows a perspective view of an embodiment of the separator system 100 according to the present invention for separating drops, in particular drops of water, out of an air inlet flow. The air inlet flow drawn in from the environment through an air inlet channel opening 50 formed in a frame wall 5 into an air inlet channel 4 of a ventilation system (which is not shown in greater detail) serves, for example, to regulate the temperature and/or for the air conditioning of spaces located in a ship or in a building. The frame wall 5 may consequently be, for example, a side wall of a ship or the outer wall of a building located, for example, near the sea, for example, of an airport relocated to be surrounded by the sea. Water and salt particles which are, for example, contained in the ambient air, as is typical near the sea, can be extracted by means of the separator system 100 from the incoming ambient air in order to prevent these particles from penetrating into the air inlet channel and the subsequent components arranged downstream. The separator system 100 has a separating body 1 extending flat in a mounting plane E which is here oriented vertically therefor.

The separating body 1, which is designed in this case as a lamellar separator, is arranged immediately behind the air inlet channel opening 50 in the flow direction S. According to the present invention, the separating body 1 is of a modular design and has, in a mounting plane E oriented perpendicular to a longitudinal axis of the air channel 4, a first separating part 1*a* arranged centrally when viewed in the flow direction S, a separately formed second separating part 1*b* arranged on the left when viewed in the flow direction S, and a separately formed third separating part 1*c* arranged on the right when viewed in the flow direction S. In the installed state, as shown, for example, in FIG. 4, the separating parts 1*a*, 1*b*, 1*c* forming the separating body 1 are arranged laterally adjacent to one another in the mounting plane E. The separating parts 1*a*, 1*b*, 1*c* can be brought, in particular individually, into or out of the mounting plane E for mounting or demounting of the separating body 1, wherein the separating body 1 can be installed and/or demounted in particular from a position P located upstream of the mounting plane E, in particular the surroundings of the air inlet channel 4.

As in particular shown in FIG. 5, the separating parts 1*a*, 1*b*, 1*c* are supported in a guide track device 3 which is fastened to the frame wall 5. The guide track device 3 in this case comprises a first guide track 30, which is configured as a U profile, in particular as a double U profile or W profile, above the air inlet channel opening 50, and a second guide track 31, which is likewise configured as a double U profile, arranged horizontally below the air inlet channel opening 50. The open side of the profile is directed in each case toward the middle of the air inlet channel 4 and is designed suitably to accommodate at least one edge portion 10, 11, 12, 13 arranged in an edge region of each separating part 1*a*, 1*b*, 1*c* so that the separating parts 1*a*, 1*b*, 1*c* can be inserted in a particularly simple manner into the guide tracks 30, 31 and can be held therein.

The guide tracks 30, 31 are arranged in the flow direction S immediately after a frame wall region 52*a*, 52*b* surrounding the air inlet channel opening 50, in particular outside a flow region or an opening height 51 of the air inlet channel opening 50. As a result, the air inlet flow remains unchanged by the support and fastening of the separating body 1. Because of the contactless arrangement of the separating body 1 relative to the frame wall 5, in particular in the frame wall region 52*a*, 52*b*, it is also possible to avoid engagement in the frame wall 5 for reasons of stability. In particular the upper first guide track 30, which is also referred to as the cover, is in this case fastened to an upper fastening web or flange 53*a* arranged in the frame wall region 52*a*, and the lower guide track 31, which is also referred to as the trough, is fastened to a lower fastening web or flange 53*b* arranged in the frame wall region 52*b*. A vertically arranged guide track 32, 33 (which is not illustrated in greater detail), which can, for example, likewise be designed as a profile, with an open side of the profile in each case directed toward the middle of the air inlet channel 4 and forming a side frame, and into which each of the separating parts 1*a*, 1*b*, 1*c* can be inserted laterally, is optionally provided in each case in the left and right side regions of the air inlet channel opening 50. This provides a particularly high stability of the separating body 1.

In the shown embodiment, a filter 2, which is likewise supported in the guide track device 3, is additionally arranged downstream of the separating body 1. Immediately downstream of the receiving profile (i.e., guide tracks 30, 31, 32, 33) for the separating body 1, the guide track device 3 has an additional receiving part or an additional profile 34 for the filter 2 therefor. The filter 2 serves, for example, to remove additional drops and/or solid particles.

The separating parts 1*a*, 1*b*, 1*c* forming the separating body 1 as well as the filter 2 are in each case displaceably supported in the guide tracks 30, 31, 32, 33, 34 so that mounting and demounting is improved. In order to increase stability, the individual separating parts, 1*a*, 1*b*, 1*c* are releasably connected to one another, in particular on the respectively tangent end faces, such as the end faces 12*a* and 13*b*, or 12*c* and 13*b* shown in FIG. 6, for example, via a plug connection (which is not illustrated in greater detail in the drawings). For further improvement of the mounting and demounting of the separating parts 1*a*, 1*b*, 1*c*, the guide tracks 30, 31, 32, 33, 34 can be formed in their longitudinal extent from a plurality of individual guide tracks, for example, the first guide track 30 is formed from the guide track segments 30*a*, 30*b*, 30*c* and the second guide track 31 is formed from the guide track segments 31*a*, 31*b*, 31*c*, wherein individual guide track segments 30*a*, 31*a* are advantageously releasably arranged on the fastening webs 53*a*, 53*b*, as is in particular shown in FIGS. 6-8.

Figure 6:
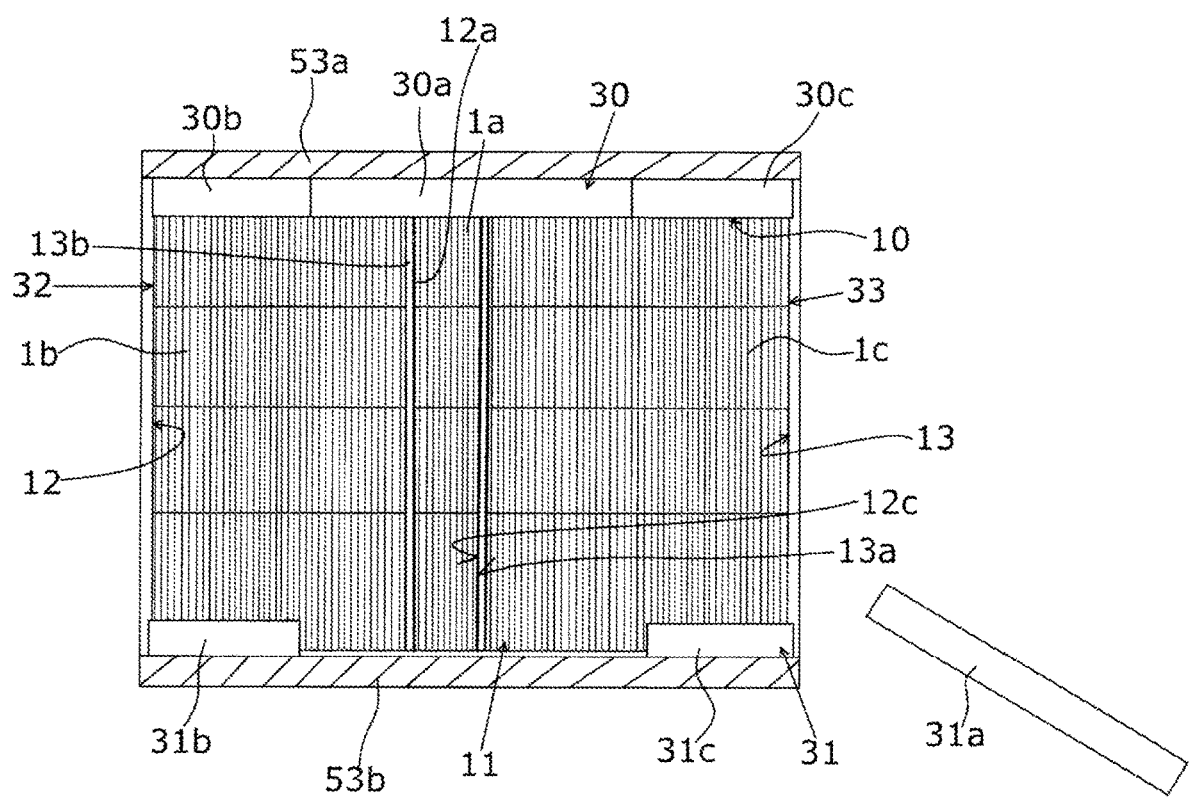
FIG. 6 shows a front view of the separator system according to FIGS. 4 and 5 during a first demounting step.
Figure 7:
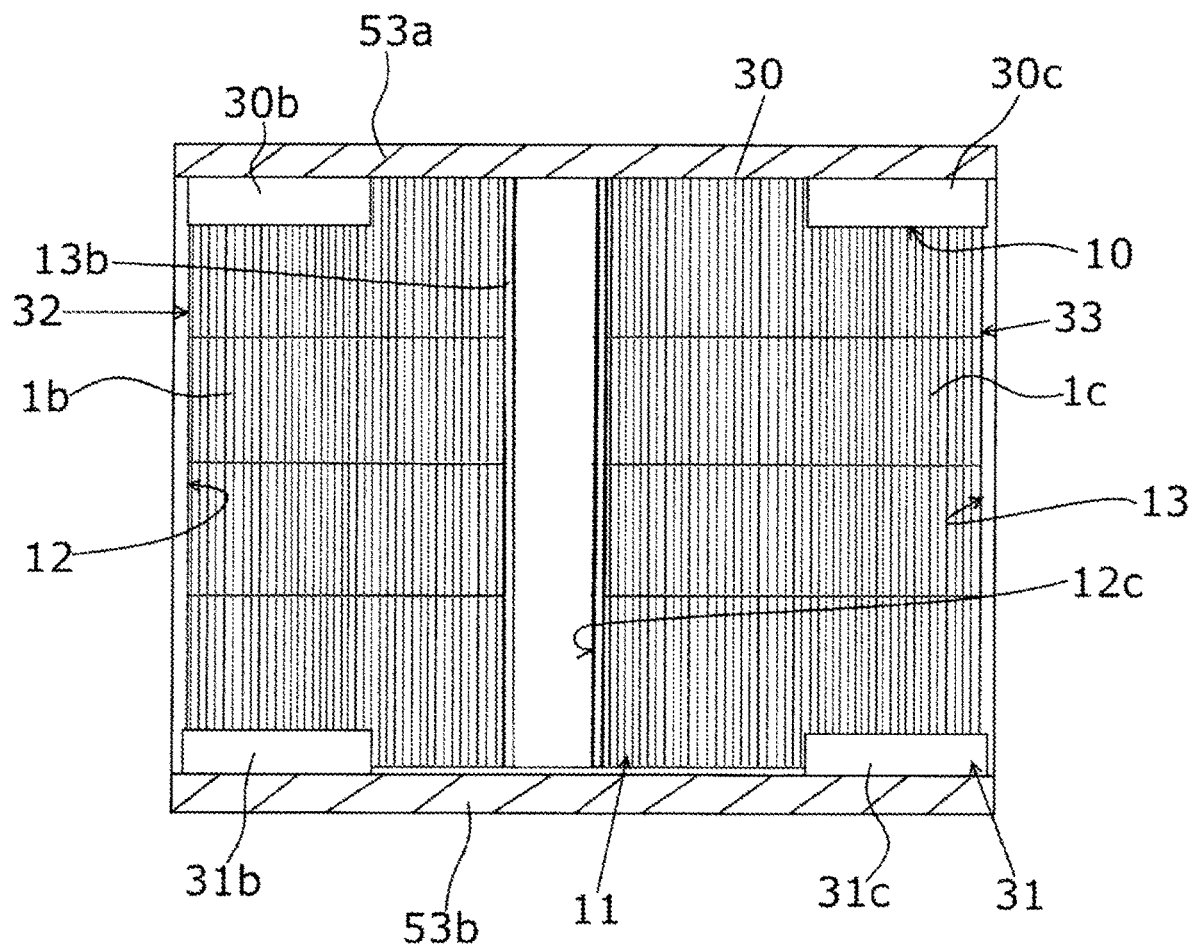
FIG. 7 shows a front view of the separator system according to FIGS. 4 and 5 during a second demounting step.
Figure 8:
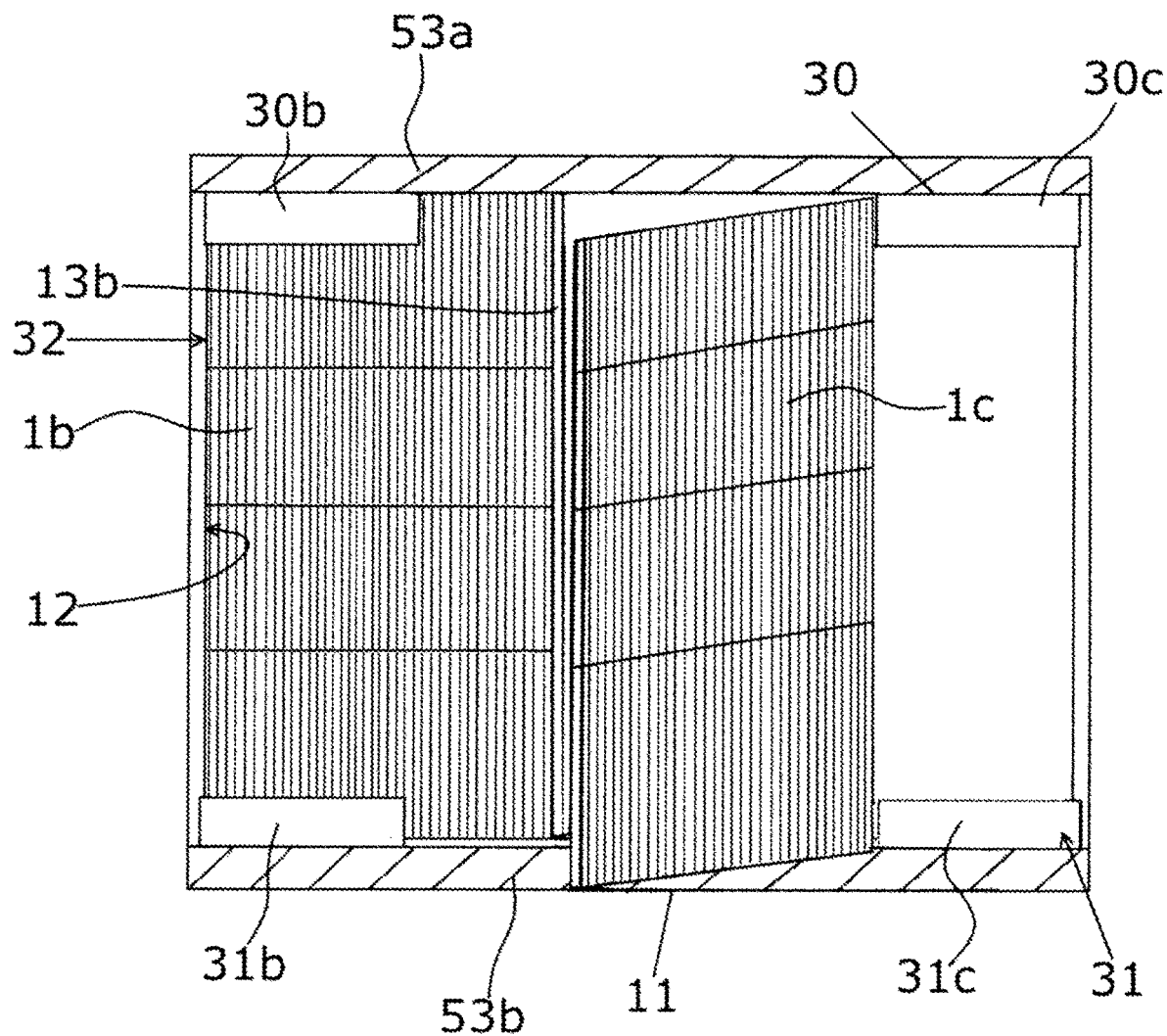
FIG. 8 shows a front view of the separator system according to FIGS. 4 and 5 during a third demounting step.

With reference to FIGS. 6-8, which each show a front view of the separator system 100 according to FIGS. 4 and 5, the sequence for demounting of the separating body 1, for example, for maintenance purposes, is explained below, wherein each mounting step is performed by reaching through the air inlet channel opening 50 from a position P located upstream of the mounting plane E outside the air inlet channel 4, in particular in the region in front of the air inlet channel opening 50.

In a first step shown in FIG. 6, each of laterally arranged second separating part 1*b* and third separating part 1*c* which are arranged respectively on the left and right when viewed in the flow direction S is in each case separated from the end faces 12*a*, 12*c* of the first separating part 1*a* on a respective end face 13*b*, 13*a* facing the centrally arranged first separating part 1*a*. For example, an easy-release catch or a clip is unlocked and the separating parts 1*b*, 1*c* are then displaced by a small distance toward the outside, i.e., in the direction away from the center of the air inlet channel 4. The guide track segment 31*a* which is releasably fastened to the lower fastening web 53*b*, for example, via screws, is then released from the lower fastening web 53*b* and removed through the air inlet channel opening 50 toward the outside. The laterally arranged separating parts 1*b* and 1*c* are in this case furthermore held in their position by guide track segments 30*b*, 30*c* and 31*b*, 31*c* arranged in each case in an upper and a lower region. After removal of the guide track segment 31*a*, the centrally arranged first separating part 1*a* is merely held in an upper region by the guide track segment 30*a*.

In a subsequent step shown in FIG. 7, the guide track segment 30*a* which is releasably fastened to the upper fastening web 53*a*, for example, via screws, is released from the upper fastening web 53*a* and removed through the air inlet channel opening 50 toward the outside. The centrally arranged first separating part 1*a* thus disengaged from the guide track device 3 can then be pivoted with a first end on a long side, advantageously the lower end, against the flow direction, and can be pivoted with the second end on a long side, advantageously the upper end, in the flow direction, and can be removed substantially in its longitudinal direction through the air inlet channel opening 50 toward the outside.

In another configuration (which is not shown in the drawings), even with only one single removed guide track segment 30a, 31a, the centrally arranged first separating part 1a can already be pivoted out or removed from the guide track device 3. The first separating part 1a in the installed state is in this case located, for example, upright on a platform, wherein the platform can be formed, for example, as a part of the guide track segment 31a. During removal of the platform or of the guide track segment 31a including the platform, as shown in FIG. 6, the first separating part 1a in this embodiment is displaced downward by a specific amount and, as a result, can become disengaged on an upper guide track segment 30a so that pivoting of the first separating part 1a in the aforementioned manner is possible in spite of the guide track segment 31a which is still installed. Alternatively, only the upper guide track segment 30a can be demounted and the first separating part 1a can be raised by a small distance so that it becomes disengaged on the lower guide track 31a and can be removed.

In a subsequent step shown in FIG. 8, the laterally arranged separating part 1c, in this case on the right when viewed in the flow direction S, is displaced along the guide track segments 30c, 31c toward the middle of the air inlet channel 4 and in the region of the demounted guide track segments 30a, 31a is removed through the air inlet channel opening 50 by a further displacement and pivoting in the manner explained with regard to the first separating part 1a. The laterally arranged first separating part 1a, in this case on the left when viewed in the flow direction, is correspondingly subsequently demounted.

In an optional subsequent step, the filter 2 arranged after the mounting plane E of the separating body 1 in the flow direction S can be removed in the same manner as described above from the additional guide track 34 (which is not illustrated in greater detail), which can likewise consist of individual releasable guide track segments.

Installation of the filter 2 and of the separating body 1 can take place in the reverse order of the aforementioned steps. Installation of the entire separator system 100 can take place, for example, as follows:

The lower second guide track 31, which is designed as a so-called trough, and the upper first guide track 30, which is designed as a so-called cover, are configured so that they are installed first, wherein the second guide track 31 can advantageously also be connected to a discharge system for discharging the drops of water and solid particles. The guide tracks 30, 31 are in this case screwed onto the fastening webs 53a, 53b formed on the frame wall 5 and subsequently form the basic components on which the other parts can be built up.

The vertical guide tracks 32, 33 are then installed as side frames. In particular in multi-stage systems, these vertical guide tracks 32, 33 have the purpose of avoiding leakages at the sides. The vertical guide tracks 32, 33 can, for example, be fixedly installed, i.e., welded or screwed, to the second guide track 31 (as a trough) and the first guide track 30 (as a cover).

The individual modules or separating parts 1a, 1b, 1c are then introduced successively through the air inlet channel opening 50 into the guide track device 3 from the front, i.e., from the exterior or before the air inlet channel 4 in the flow direction S. The separating parts 1b and 1c arranged on the right and left of the center of the air inlet channel 4 arranged are in particular installed first. In the guide track device 3, these separating parts can be displaced in particular to the left or the right from the center of the air inlet channel 4.

Lastly, the moderate first separating part 1a is introduced. This can, for example, be a relatively narrow separating part in the mounting plane E with relatively few lamellas, with the lamellas being somewhat shorter than the lamellas of the other separating parts. The first separating part 1a is inserted into the second guide track 31 (trough), tilted in at the top, and then raised to some extent until the first separating part 1a engages at the top in the guide track segment 30a and is retained thereby. The first separating part 1a is then raised onto a small platform which is arranged in the second guide track 31 (trough). This is the final position of the centrally arranged first separating part 1a.

The laterally arranged second separating part 1b and third separating part 1c are then pulled toward the center of the air inlet channel 4 onto the centrally arranged first separating part 1a and can, for example, be connected to one another by easy-release clips. These so-called spacer clips hold the sets firmly so that the respective separating parts 1b, 1c forming a lamella set cannot move back into the second guide track 31 (trough). The individual separating parts 1a, 1b, 1c form a total set, the separating body 1, via this connection.

It should be clear that the scope of protection of the present invention is not limited to the described exemplary embodiment. The configuration of the air inlet channel opening, the air channel, as well as the type of fastening of the separating body 1 can in particular certainly be modified without altering the concept of the present invention. Reference should also be had to the appended claims.

LIST OF REFERENCE NUMERALS 100 separator system
1 separating body
1a first separating part
1b second separating part
1c third separating part
2 filter
3 guide track device
4 air inlet channel
5 frame wall
10 edge portion
11 edge portion
12 edge portion
12a end faces
12c end faces
13 edge portion
13a end faces
13b end faces
30 first guide track (cover)
30a guide track segment
30b guide track segment
30c guide track segment
31 second guide track (trough)
31a guide track segment
31b guide track segment
31c guide track segment
32 vertical guide track (side frame)
33 vertical guide track (side frame)
34 guide track, additional receiving part, additional guide track, additional profile
50 air inlet channel opening
51 opening height 52a frame wall region
52b frame wall region
53a upper fastening web or flange
53b lower fastening web or flange
E mounting plane
P position
S flow direction

What is claimed is:

1. A separator system for separating drops and solid particles from an air inlet flow, the separator system comprising:
an air inlet channel opening; and
a separating body which is configured to be internally installed, the separating body being arranged downstream of the air inlet channel opening so as to completely cover the air inlet channel opening and to extend flat in a mounting plane, the separating body being provided as a modular design and comprising, in the mounting plane,
at least one first separating part, and
at least one second separating part which is arranged to be separate from the at least one first separating part, wherein,
the separating body is configured so that, during an assembly thereof, the at least one second separating part is first inserted centrally through the air inlet channel opening and is fastened in the mounting plane laterally offset with respect to a center of the air inlet channel opening, and that, subsequent thereto, the at least one first separating part is then inserted centrally through the air inlet channel opening and is fastened in the mounting plane laterally offset with respect to the center of the air inlet channel opening next to the at least one second separating part.

2. The separator system as recited in claim 1, wherein the separating body is further configured to be mountable from a position which is located upstream of the mounting plane as viewed with respect to the air inlet flow.

3. The separator system as recited in claim 1, wherein the separating body further comprises an effective separating surface area which corresponds at least to the effective separating surface area of a superimposed separator system or an inserted separator system.

4. The separator system as recited in claim 1, further comprising:
a frame wall region which surrounds the air inlet channel opening in the flow direction,
wherein,
the separating body further comprises at least one edge portion, and
the separating body is arranged to overlap with the frame wall region in at least one edge portion.

5. The separator system as recited in claim 4, wherein the separating body is arranged to avoid a contact with the frame wall region.

6. The separator system as recited in claim 1, wherein the at least one first separating part and the at least one second separating part are each configured to be inserted into or removed from the mounting plane.

7. The separator system as recited in claim 1, wherein the at least one first separating part and the at least one second separating part are each configured to be releasably connected to each other in an installed state.

8. The separator system as recited in claim 1, wherein,
the at least one first separating part comprises two opposing end faces,
the at least one second separating part comprises two opposing end faces,
at least one plug connection element is arranged on each of the two opposing end faces of the at least one first separating part, and
at least one plug connecting element is arranged on each of the two opposing end faces of the at least one second separating part.

9. The separator system as recited in claim 1, further comprising:
at least one guide track,
wherein,
the separating body is supported in the at least one guide track.

10. The separator system as recited in claim 9, wherein one or more of the separating body, the at least one first separating part, and the at least one second separating part are configured to be displaced in the at least one guide track.

11. The separator system as recited in claim 9, wherein the at least one guide track comprises at least two guide track segments each of which is configured to be independently releasable.

12. The separator system as recited in claim 9, further comprising:
an additional separator or filter supported the guide track downstream of the separating body as viewed with respect to the air inlet flow.

13. The separator system as recited in claim 1, further comprising:
a frame wall which is configured to extend flat,
wherein,
the air inlet channel opening is formed by the frame wall.

14. The separator system as recited in claim 1, wherein the mounting plane is oriented vertically relative to the horizontal.

15. The separator system as recited in claim 1, wherein the mounting plane is oriented at an angle of at least 45° relative to the horizontal.

* * * * *